June 23, 1925.
J. B. STARKEY
POWER TRANSMITTING DEVICE.
Filed March 30, 1923 2 Sheets-Sheet 1
1,543,400
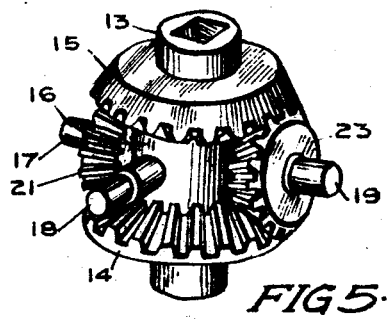
FIG 5.
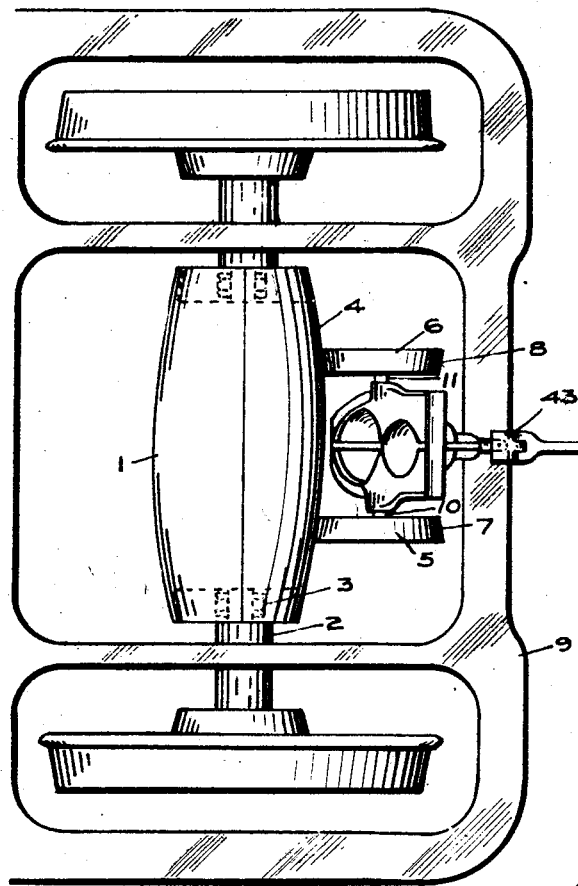
FIG. 1
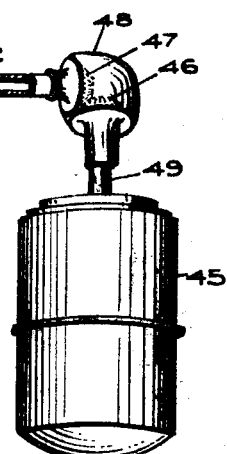
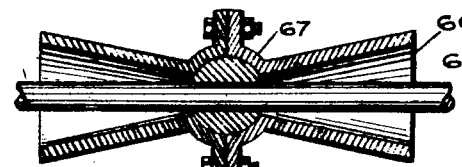
FIG. 7.
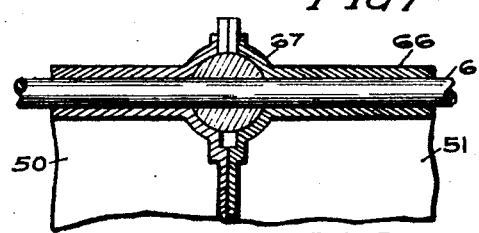
FIG. 8.
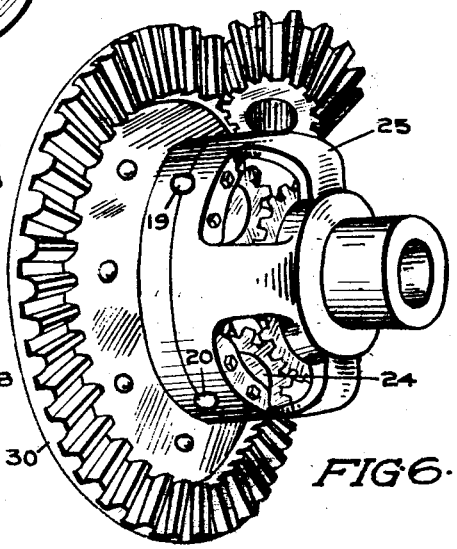
FIG. 6.
Inventor
J. B. Starkey,
By C. J. F. Thurstonhaugh.
Attorney June 23, 1925.
J. B. STARKEY
POWER TRANSMITTING DEVICE
Filed March 30, 1923 2 Sheets-Sheet 2
1,543,400
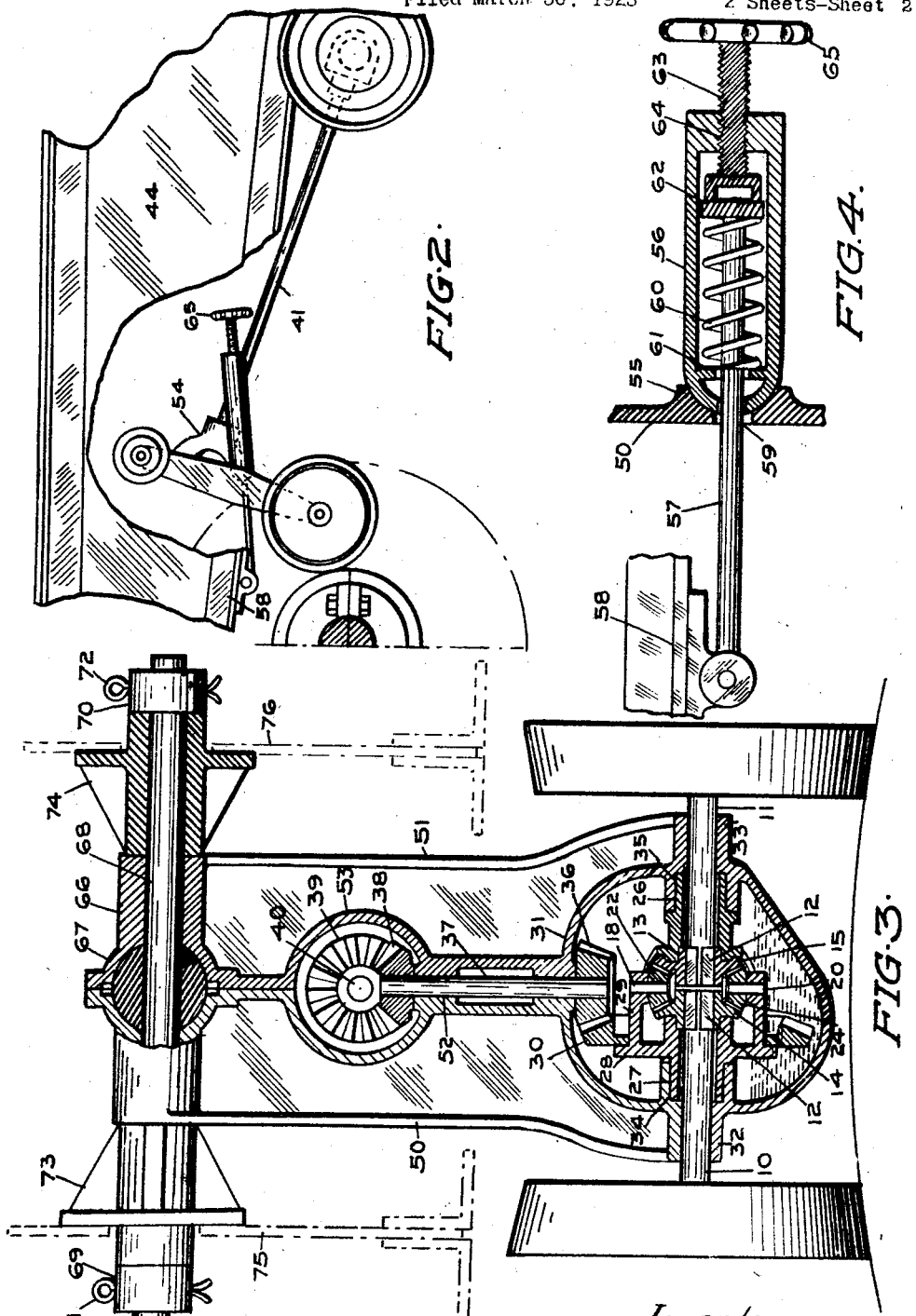

Patented June 23, 1925.

1,543,400

UNITED STATES PATENT OFFICE.

JOHN BAPTIST STARKEY, OF MONTREAL, QUEBEC, CANADA.

POWER-TRANSMITTING DEVICE.

Application filed March 30, 1923. Serial No. 628,730.

*To all whom it may concern:*

Be it known that I, JOHN BAPTIST STARKEY, a subject of the King of Great Britain, and residing at 543 Madison Avenue, in the city of Montreal, in the Province of Quebec, in the Dominion of Canada, have invented a new and useful Power-Transmitting Device, of which the following is the specification.

The invention relates to a power transmitting device as described in the present specification and shown in the accompanying drawings that form part of the same.

The invention consists essentially of the novel features pointed out broadly and specifically in the claims for novelty following a description containing an explanation in detail of an acceptable form of the invention.

The objects of the invention are to transmit power from the axle of a moving vehicle, particularly from a car axle for lighting, ventilating and other purposes and to maintain a constant drive while the axle is rotating; to minimize the expenses incident to the maintenance of the machinery by eliminating the losses due to the dropping of belts and the breakages in ordinary gear transmissions; to simplify the mechanism in such devices and thereby reduce the time and labor required for their care and proper upkeep; to facilitate the operations of a dynamo in electric lighting plants in steam railway cars; to furnish a transmission of good mechanical design for whatever purpose to which it may be suitably applied and generally to provide a durable, serviceable and efficient transmitting device.

In the drawings, Figure 1 is a plan view of the transmission as applied to a railway car.

Figure 2 is an elevation showing a similar application of the transmission.

Figure 3 is a vertical sectional view of the differential gear and the connections from the friction wheels to the driven gear.

Figure 4 is a sectional detail of the resilient holding device behind the friction wheels.

Figure 5 is a perspective detail of the differential gear showing it with one pinion removed.

Figure 6 is a perspective detail of the differential gear frame assembled with the driving gear.

Figure 7 is a sectional detail of the casing supporting device showing the sleeve formed to permit a limited side play.

Figure 8 is a sectional detail of the same supporting device showing the sleeve at right angles to the position shown in Figure 7.

Like numerals of reference indicate corresponding parts in the various figures.

Referring to the drawings, the friction drive roll 1 is shown as split and mounted on the car axle 2, the halves being rigidly secured together by the bolts 3.

The drive roll 1 is formed with a friction face 4 arc-shaped in longitudinal section and concentric with the path of the truck in its swing rounding curves.

The drive roll 1 is engaged by the friction wheels 5 and 6 which are formed with a slight bevel inwardly to their friction faces 7 and 8, so as to fully engage the roll 1, no matter what the position of the truck 9 may be in the course of travel of the vehicle.

The wheels 5 and 6 are fixedly mounted on the shafts 10 and 11 at the outer ends of said shafts and the latter at their inner ends 12 are squared and inserted in correspondingly squared holes in the differential hubs 13.

The bevel gears 14 and 15 are rigid respectively with the hubs 13 on the shafts 10 and 11 at the opposite ends to the friction wheels 5 and 6 and the spider 16 is loosely mounted on said differential hubs between the gears 14 and 15 and carries the four stub shafts 17, 18, 19 and 20, the shafts 17 and 18 being diametrically opposite to one another and at right angles to the shafts 19 and 20 similarly placed.

The bevel pinions 21, 22 and 23 and 24 are mounted on the said stub shafts respectively and engage the gears 14 and 15 and complete the differential, which in itself is not novel though its application to this mechanism has not been made before so far as I am aware.

The stub shafts 17, 18, 19 and 20 project through a frame 25 at one end 26 encircling and clear of the shaft 11 and at the other end 27 encircling and clear of the shaft 10 and having an annular flange 28 from the body 29, the latter forming a mounting for the bevel gear 30 and the former a backing to which said gear is bolted.

The casing 31 forms the bearings 32 and 33 for the shafts 10 and 11 and these shafts as explained support the differential hub 13 and its gears and as the differential gears 14 and 15 are constantly driven by the frictional contact of the wheels 5 and 6 with the roll 1, the frame 25 will rotate coincidently as these gears 14 and 15 are in constant engagement with the pinions 21, 22, 23 and 24. The shafts of these pinions project through corresponding shaft holes in said frame and carry the latter with them in rotation, but should there be any difference in speed between the gear 14 and the gear 15, it will be taken care of by the rotation of said pinions which under normal speed conditions remain stationary on their shafts, but because of the varying diameters of the roll 1 and the frequent swing of the truck due to curves, the wheels 5 and 6 are bound to engage diameters of different dimensions at times and thus make it necessary to accommodate the mechanism accordingly.

The rotation of the frame 25 which bears on the bearings 34 and 35, from the casing 31 drives the gear 30 and this coacts with the bevel gear 36 connected through the shaft 37 with the bevel gear 38, which drives the gear 39 mounted at the end of the transmission shaft 40, which is formed of the part 41 telescoping into the part 42 and suitably keyed thereto.

The universal joint 43 is introduced into the transmission shaft so that any movement of the car body 44 in relation to said truck will be easily accounted for and as the section 42 of the transmission shaft is connected to the dynamo 45 through the bevel gears 46 and 47 within the casing 48 supported from the armature shaft 49, the latter will be rotated coincidently with the friction wheels 5 and 6.

The casing 31 extends from the bearings 32 and 33 into the webs 50 and 51 and is centrally reinforced above the casing proper to form the shaft bearing 52 leading into the intermediate casing 53 containing the bevel gears 38 and 39, the said intermediate casing forming a bearing 54 for the transmission shaft 37.

The webs 50 and 51 each have a spherical bearing 55 into which the nose ends of the compression spring cases 56 are introduced and supported therein by the adjusting rods 57 pivotally secured to the centre sill 58 of the car body and projecting through corresponding orifices 59 in said webs.

The compression springs 60 encircle the rods 57 within the cases 56 and at the one end abut the stops 61 within and from the cases 56 and at the other end abut the collars 62 fixedly secured on the rods 57, the latter being adjusted by the rods 63 on the collars 62 and turning in the correspondingly threaded orifice 64 in the outer ends of each case 56, said rods 63 being turned by the hand wheels 65 mounted on their outer ends.

In this manner the friction wheels 5 and 6 are firmly held to the roll 1 and if it is desired to remove them from contact therewith the springs 60 are further compressed by turning the hand wheels 65 and this permits the casings 31 to swing away from the roll 1 and thus free the wheels 5 and 6 from contact therewith.

The webs 50 and 51 at the upper ends terminate in the sleeve 66, which is centrally formed into the ball casing 67 being split through the centre correspondingly to the central split between webs and through the upper half of the casing 31, the lower half of the latter forming an oil well under the gear 30 and having suitable flanges for bolting it to the said upper half.

The sleeve 66 flares laterally from the ball casing 67 to permit the rod 68 side play but not end play, said rod 68 extending therethrough and carrying the end collars 69 and 70 secured by the cotters 71 and 72, said rod 68 being supported in the flanged brackets 73 and 74 and rigidly secured to the sills 75 and 76 through their flanges.

In the operation of the invention the friction wheels 5 and 6 are engaged by the roll 1, which rotates with the axle just as soon as the car begins to move and this motion is communicated to the bevel gears on the shafts 10 and 11, said gears forming part of the differential group. The rotation of said bevels carries the frame 25 with them through the connecting pinions and thus the bevel gear 30 mounted on the frame 25 is driven, which in turn drives the transmission bevel gear and consequently the dynamo or other machine or device to be operated.

What I claim is:—

1. In a power transmitting device, a friction drive having a roll mounted on a car axle and formed with a wide face arc-shaped in longitudinal section and concentric with the swing of the axle and movable over the faces of a pair of friction wheels suitably mounted and journalled and a transmission shaft and gearing, inclusive of a differential group of gears, communicating the motion of said friction wheels to the device to be driven.

2. In a power transmitting device, a friction drive having a wide faced roll longitudinally curved and mounted on a car axle and movable on a pair of friction wheels separately mounted on shafts extending towards one another, a differential group of gears and frame and mounting engaged by said shafts, and a transmission shaft and gearing operated through said differential group.

3. In a power transmitting device, a car axle forming a driving shaft, a roll mounted on said axle and having a wide face arc-shaped in longitudinal section, a frame adapted to swing from the car body and carrying a gear casing at the lower end, a pair of friction wheels having shafts journalled in the walls of said casing and movable over the face of said friction roll, a differential gearing mounted on the inner ends of said friction wheel shafts, a bevel gear operatively mounted in relation to said differential, a transmission gear operatively connected with said bevel gear and a transmission shaft carrying said transmission gear and operated thereby.

4. In a power transmitting device, a car axle forming a driving shaft, a split roll having its halves brought together over said axle and rigidly secured together and tapering from the centre towards the ends, a frame adapted to swing from the car body and carrying a gear casing at the lower end, a pair of friction wheels having shafts journalled in the walls of said casing and movable over the face of said roll, a differential gearing mounted on the ends of said shafts, a bevel gear mounted on the frame of said differential, a transmission gear operatively connected with said bevel gear, and a transmission shaft carrying said transmission gear and operated thereby.

5. In a power transmitting device, a car axle forming a driving shaft, a roll mounted on said axle and having a wide face arc-shaped in longitudinal section, a casing forming shaft bearings and frame bearings and extending into a web suspended from the car body, a pair of friction wheels having shafts journalled in the walls of said casing and movable over the face of said roll, a differential gearing mounted on the ends of said shafts, a bevel gear mounted on the frame of said differential, a transmission gear operatively connected with said bevel gear, and a transmission shaft carrying said transmission gear and operated thereby.

6. In a power transmitting device, a car axle forming a driving shaft, a roll mounted on said axle and having a wide face arc-shaped in longitudinal section, a casing having elongated shaft bearings and interior frame bearings and an oil well bottom secured to the split upper portion and suspended therewith from the car body, a pair of friction wheels having shafts journalled in the walls of said casing and movable over the face of said roll, a differential gearing mounted on the ends of said shafts, a bevel gear mounted on the frame of said differential, a transmission gear operatively connected with said bevel gear and a transmission shaft carrying said transmission gear and operated thereby.

7. In a power transmitting device, a car axle forming a driving shaft, a roll mounted on said axle and having a wide face arc-shaped in longitudinal section, a casing having shaft bearings and frame bearings and web extensions supporting an intermediate gear casing and a bottom forming an oil well and suspended from the car body, a pair of friction wheels having shafts journalled in the walls of said casing and movable over the face of said roll, a differential gearing mounted on the ends of said shafts, a bevel gear mounted on the frame of said differential, a transmission gear operatively connected with said bevel gear, and a transmission shaft carrying said transmission gear and operated thereby.

8. In a power transmitting device, a car axle forming a driving shaft, a roll mounted on said axle and having a wide face arc-shaped in longitudinal section, a casing split vertically and having an extension therefrom meeting in a shaft passage and intermediate casing and a bottom forming an oil well, means for suspending said casing from the car body, a pair of friction wheels having shafts journalled in the walls of said casing and movable over the face of said roll, a differential gearing mounted on the ends of said shafts, a bevel gear mounted on the frame of said differential, a transmission gear operatively connected with said bevel gear, and a transmission shaft carrying said transmission gear and operated thereby.

9. In a power transmitting device, a car axle forming a driving shaft, a roll mounted on said axle and having a wide face arc-shaped in longitudinal section, a casing having web extensions therefrom supporting a shaft passage and an intermediate casing and terminating in a sleeve at the upper end and a bottom forming an oil well, a shaft supported in brackets from the car body and extending through said sleeve, a pair of friction wheels having shafts journalled in the walls of said casing and movable over the face of said roll, a differential gearing mounted on the ends of said shafts, a bevel gear mounted on the frame of said differential, a transmission gear operatively connected with said bevel gear and a transmission shaft carrying said transmission gear and operated thereby.

10. In a power transmitting device, a car axle forming a driving shaft, a roll mounted on said axle and having a wide face arc-shaped in longitudinal section, a split casing having web extensions and a bottom, all securely bolted together and terminating at the upper end in a sleeve having flaring shaft orifices from a ball casing in the centre thereof, a shaft carrying a ball within the ball casing, a pair of brackets secured to the car body and supporting said shaft, a pair of friction wheels having shafts journalled in the walls of said casing and movable over the face of said roll, a differential gearing mounted on the ends of said shafts, a bevel gear mounted on the frame of said differential, a transmission gear operatively connected with said bevel gear and a transmission shaft carrying said transmission gear and operated thereby.

11. In a power transmitting device, a car axle forming a driving shaft, a roll mounted on said axle and having a wide face arc-shaped in longitudinal section, a split casing having a bottom portion forming an oil well and extensions therefrom supporting a shaft passage and intermediate casing and a sleeve at the upper end flared from a central ball casing to permit lateral play during operation, a shaft having a ball in said casing, brackets supporting said shaft from the car body, means for resiliently holding said casing towards said roll and axle, a pair of friction wheels having shafts journalled in the walls of said casing and movable over the face of said roll, a differential gearing mounted on the ends of said shafts, a bevel gear mounted on the frame of said differential, a transmission gear operatively connected with said bevel gear and a transmission shaft carrying said transmission gear and operated thereby.

12. In a power transmitting device, a car axle forming a driving shaft, a roll mounted on said axle and having a wide face arc-shaped in longitudinal section, a casing having shaft and frame bearings and suspended from the car body, a compression spring and case holding said casing in the direction of the roll and axle and having a rotatable rod and stop therethrough, a pair of friction wheels having shafts journalled in the walls of said casing and movable over the face of said roll, a differential gearing mounted on the ends of said shafts, a bevel gear mounted on the frame of said differential, a transmission gear operatively connected with said bevel gear and a transmission shaft carrying said transmission gear and operated thereby.

13. In a power transmitting device, a car axle forming a driving shaft, a roll mounted on said axle and having a wide face arc-shaped in longitudinal section, a casing suspended from the car body and having shaft and frame bearings and spherical case bearings, pivoted rods secured to the car frame and having stops at their ends, cases enclosing said rod ends and stops and engaging said spherical case bearings, compression springs in said cases between the inner ends thereof and said stop, screws having hand wheels and screwing through the outer ends of said cases and engaging said stops, a pair of friction wheels having shafts journalled in the walls of said casing and movable over the face of said roll, a differential gearing mounted on the ends of said shafts, a bevel gear mounted on the frame of said differential, a transmission gear operatively connected with said bevel gear and a transmission shaft carrying said transmission gear and operated thereby.

14. In a power transmitting device, a car axle forming a driving shaft, a roll mounted on said axle and having a wide face arc-shaped in longitudinal section, a frame adapted to swing from the car body and carrying a gear casing at the lower end, a pair of friction wheels mounted at the outer ends of a pair of shafts projecting from each side into said casing and having inwardly bevelled friction faces and rotating in bearings in the walls of said casing and movable over the face of said roll, a differential gearing mounted on the ends of said shafts, a bevel gear mounted on the frame of said differential, a transmission gear operatively connected with said bevel gear and a transmission shaft carrying said transmission gear and operated thereby.

15. In a power transmitting device, a car axle forming a driving shaft, a roll mounted on said axle and having a wide face arc-shaped in longitudinal section, a frame adapted to swing from the car body and carrying a gear casing at the lower end, a pair of friction wheels having shafts journalled in the walls of said casing and movable over the face of said roll, a frame forming a bevel gear mounting and journalled within said gear casing, a differential gearing having bevel gears fixedly mounted on said friction wheel shafts and driving said frame, a bevel gear mounted on the frame of said differential, a transmission gear operatively connected with said bevel gear and a transmission shaft carrying said transmission gear and operated thereby.

16. In a power transmitting device, a car axle forming a driving shaft, a roll mounted on said axle and having a wide face arc-shaped in longitudinal section, a frame adapted to swing from the car body and carrying a gear casing at the lower end, a pair of friction wheels having shafts journalled in the walls of said casing and movable over the face of said roll, a differential gearing mounted on the ends of said shafts, a bevel gear mounted on the frame of said differential, a gear coacting with said bevel gear, a shaft carrying said coacting gear and having a gear at the upper end thereof and suitably journalled, a transmission shaft gear, and a transmission shaft carrying said transmission gear and operated thereby.

17. In a power transmitting device, a car axle forming a driving shaft, a roll mounted on said axle and having a wide face arc-shaped in longitudinal section, a frame adapted to swing from the car body and carrying a gear casing at the lower end, a pair of friction wheels having shafts journalled in the walls of said casing and movable over the face of said roll, a differential gearing mounted on the ends of said shafts, a bevel gear mounted on the frame of said differential, a coacting bevel gear within said gear casing, a shaft therefrom extending upwardly, an intermediate casing supported in the aforesaid gear casing frame, coacting gears in said intermediate casing operated by said upwardly extending shaft, and a transmission shaft carrying said transmission gear and operated thereby.

18. A power transmitting device, comprising a tapered roll on a car axle and friction wheels on shafts journalled in an equalizing mounting and resiliently held to the roll and transmitting their power through suitable gears to the machine to be driven.

Signed at Montreal, Canada, this 27th day of March, 1923.

JOHN BAPTIST STARKEY.